United States Patent
Safiuddin

(10) Patent No.: US 12,270,643 B2
(45) Date of Patent: Apr. 8, 2025

(54) ANGLE SENSING HAVING OFFSET AND AMPLITUDE CORRECTION OF ORTHOGONAL SIGNALS USING ZERO CROSSING DETECTION

(71) Applicant: Allegro MicroSystems, LLC, Manchester, NH (US)

(72) Inventor: Mohammed Safiuddin, Manchester, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 150 days.

(21) Appl. No.: 18/177,817

(22) Filed: Mar. 3, 2023

(65) Prior Publication Data

US 2024/0295394 A1    Sep. 5, 2024

(51) Int. Cl.
G01B 7/30    (2006.01)
(52) U.S. Cl.
CPC ..................... *G01B 7/30* (2013.01)
(58) Field of Classification Search
CPC .................................................. G01B 7/30
See application file for complete search history.

(56) References Cited

U.S. PATENT DOCUMENTS

| | | | |
|---|---|---|---|
| 8,786,279 B2 | 7/2014 | Petrie | |
| 8,860,410 B2 | 10/2014 | Petrie | |
| 9,062,990 B2 | 6/2015 | Petrie | |
| 9,182,250 B2 | 11/2015 | Petrie | |
| 9,739,637 B2 * | 8/2017 | Feucht | G01D 5/145 |
| 10,288,698 B2 | 5/2019 | Romero | |
| 10,380,879 B2 | 8/2019 | Haas et al. | |
| 10,580,289 B2 | 3/2020 | Haas et al. | |
| 10,636,285 B2 | 4/2020 | Haas et al. | |
| 10,692,362 B2 | 6/2020 | Petrie et al. | |
| 10,852,161 B2 | 12/2020 | Cesaretti et al. | |
| 10,884,092 B2 | 1/2021 | Rigoni et al. | |
| 11,237,020 B2 | 2/2022 | David et al. | |
| 11,280,637 B2 | 3/2022 | Diaconu et al. | |
| 11,480,630 B2 | 10/2022 | Deligiannis et al. | |
| 2020/0081073 A1 * | 3/2020 | Richards | G01R 33/0029 |

* cited by examiner

*Primary Examiner* — Reena Aurora
(74) *Attorney, Agent, or Firm* — DALY, CROWLEY, MOFFORD & DURKEE, LLP

(57) ABSTRACT

Methods and apparatus for determining signal offset correction signals. In embodiments, first and second magnetic field sensing elements generate first and second channels that are in quadrature. Signal correction processing includes storing amplitudes of the first and second channel signals when an amplitude of the channel signals cross zero and determine an offset of the first and second channel signals based on the stored amplitudes.

16 Claims, 9 Drawing Sheets

ANGLE SENSING HAVING OFFSET AND AMPLITUDE CORRECTION OF ORTHOGONAL SIGNALS USING ZERO CROSSING DETECTION

BACKGROUND

As is known, sensors are used in various types of devices to measure and monitor properties of systems in a wide variety of applications. For example, sensors have become common in products that rely on electronics in their operation, such as automotive and motor control systems.

Some sensors monitor properties by detecting a magnetic field associated with proximity or movement of a target object with respect to one or more magnetic field sensing elements. In magnetic field sensors including multiple magnetic field sensing elements, magnetic field signals from the sensing elements can be processed by separate processing channels that can be combined to generate an output corresponding to angular position. Conventional angle sensors may perform significant processing of the signals from the channels to correct for offset or amplitude errors.

SUMMARY

Example embodiments of the disclosure provide methods and apparatus for angle sensing having offset and/or amplitude correction using zero crossing detection of orthogonal sensor signals from respective sensing elements. An error in angle output can be reduced by correcting offsets and/amplitude mismatch of the sensor signals.

In one aspect, a method comprises: receiving a first channel signal from a first magnetic field sensing element; receiving a second channel signal from a second magnetic field sensing element, wherein the first and second channel signals are in quadrature; storing an amplitude of the first channel signal when an amplitude of the second channel signal crosses a threshold when the second channel signal is increasing and decreasing; and determining an offset of the first channel signal based on the stored amplitudes of the first channel signal.

A method can further include one or more of the following features: the threshold is a zero crossing, the first channel signal comprises a sine signal and the second channel signal comprises a cosine signal, storing an amplitude of the second channel signal when an amplitude of the first channel signal crosses a threshold when the first channel signal is increasing and decreasing, determining an offset of the second channel signal based on the stored amplitudes of the second channel signal, normalizing amplitudes of the first and second channel signals, normalizing amplitudes of the first and second channel signals comprising adjusting only a first one of the first and second channel signals, determining the offset of the first channel signal comprising taking an average of the first channel signal at consecutive zero crossings of the second channel signal, and/or detecting a zero crossing of the second channel signal by detecting a sign change of a delayed version of the second channel signal.

In another aspect, a system comprises: a first magnetic field sensing element to generate a first channel signal from a first magnetic field sensing element; a second magnetic field sensing element to generate a second channel signal, wherein the first and second channel signals are in quadrature; and a signal correction module configured to: store an amplitude of the first channel signal when an amplitude of the second channel signal crosses a threshold when the second channel signal is increasing and decreasing; and determine an offset of the first channel signal based on the stored amplitudes of the first channel signal.

A system can further include one or more of the following features: the threshold is a zero crossing, the first channel signal comprises a sine signal and the second channel signal comprises a cosine signal, the signal correction module is further configured to store an amplitude of the second channel signal when an amplitude of the first channel signal crosses a threshold when the first channel signal is increasing and decreasing, the signal correction module is further configured to determine an offset of the second channel signal based on the stored amplitudes of the second channel signal, the signal correction module is further configured to normalize amplitudes of the first and second channel signals, normalizing amplitudes of the first and second channel signals comprises adjusting only a first one of the first and second channel signals, determining the offset of the first channel signal comprises taking an average of the first channel signal at consecutive zero crossings of the second channel signal, the signal correction module is further configured to detect a zero crossing of the second channel signal by detecting a sign change of a delayed version of the second channel signal, and/or the system comprises an IC package.

BRIEF DESCRIPTION OF THE DRAWINGS

The foregoing features of the disclosure, as well as the disclosure itself may be more fully understood from the following detailed description of the drawings. The drawings aid in explaining and understanding the disclosed technology by depicting one or more example embodiments. Accordingly, the figures are not intended to limit the scope of the invention. Like numbers in the figures denote like elements.

DETAILED DESCRIPTION

Figure 1:
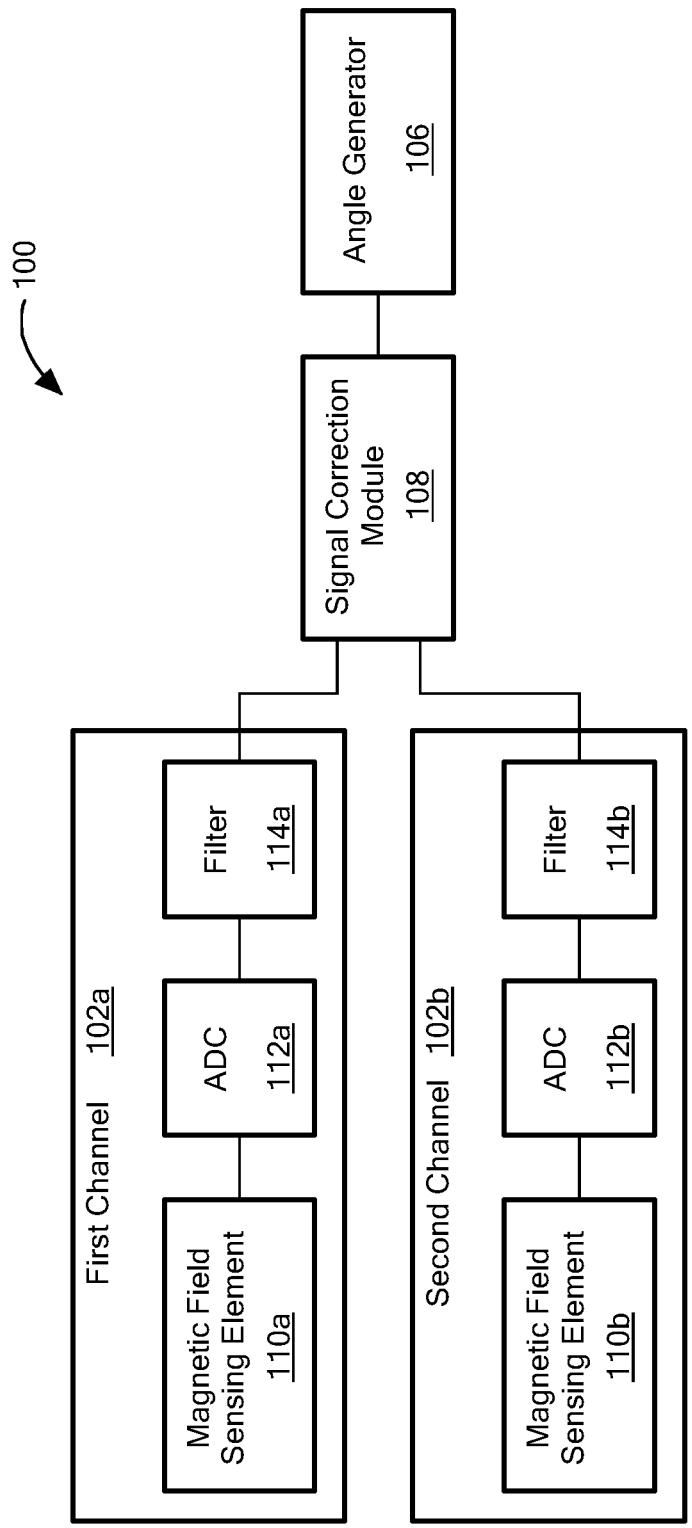
FIG. 1 shows a block diagram of a dual-channel magnetic field sensor that uses zero crossing detection of orthogonal sensor signals to reduce output error by correcting offsets and/amplitude mismatch of the sensor signals.

FIG. 1 shows a block diagram of a magnetic field angle sensor 100 having a first sensing element channel 102*a* and a second sensing element channel 102*b* generating orthogonal signals, such as sine and cosine signals, for processing by an angle generation module 106 after correction by a signal correction module 108 for the signals. The first channel 102*a* includes a first magnetic field sensing element 110*a* coupled to an analog-to-digital (ADC) 112*a* that digitizes the analog signal from the magnetic field sensing element. The output of the ADC 112*a* is provided to a filter 114*a*. The magnetic field sensing element 110*a* can comprise a Hall effect element, MR element, or other appropriate sensing element.

Similarly, the second channel 102b includes a second magnetic field sensing element 110b coupled to an analog-to-digital (ADC) 112b, a filter 114b the output of which may be connected directly to the angle generation module 106. In some embodiments, the signal correction module 108 may provide offset and/or amplitude correction for the second channel.

The angle generation module 106 is configured to generate an angle signal from the first and second magnetic field signals generated by the first and second magnetic field sensing elements 110a,b. This can be accomplished, for example, by calculating the arctangent of the magnetic field signals or by using a look-up table using values to determine the corresponding angle of the object.

Example embodiments enable offset and/or amplitude correction of sensor signals from magnetic field sensing elements for reducing errors in angular position of target. As described more fully below, offsets from orthogonal left (L) and right (R) sensing element signals can be removed. In addition, the amplitude of the L and R signals can be equalized if desired. In some embodiments, amplitude correction is performed on only one of the channels. In other embodiments, offset and/or amplitude correction is performed on both channels.

Figure 2:
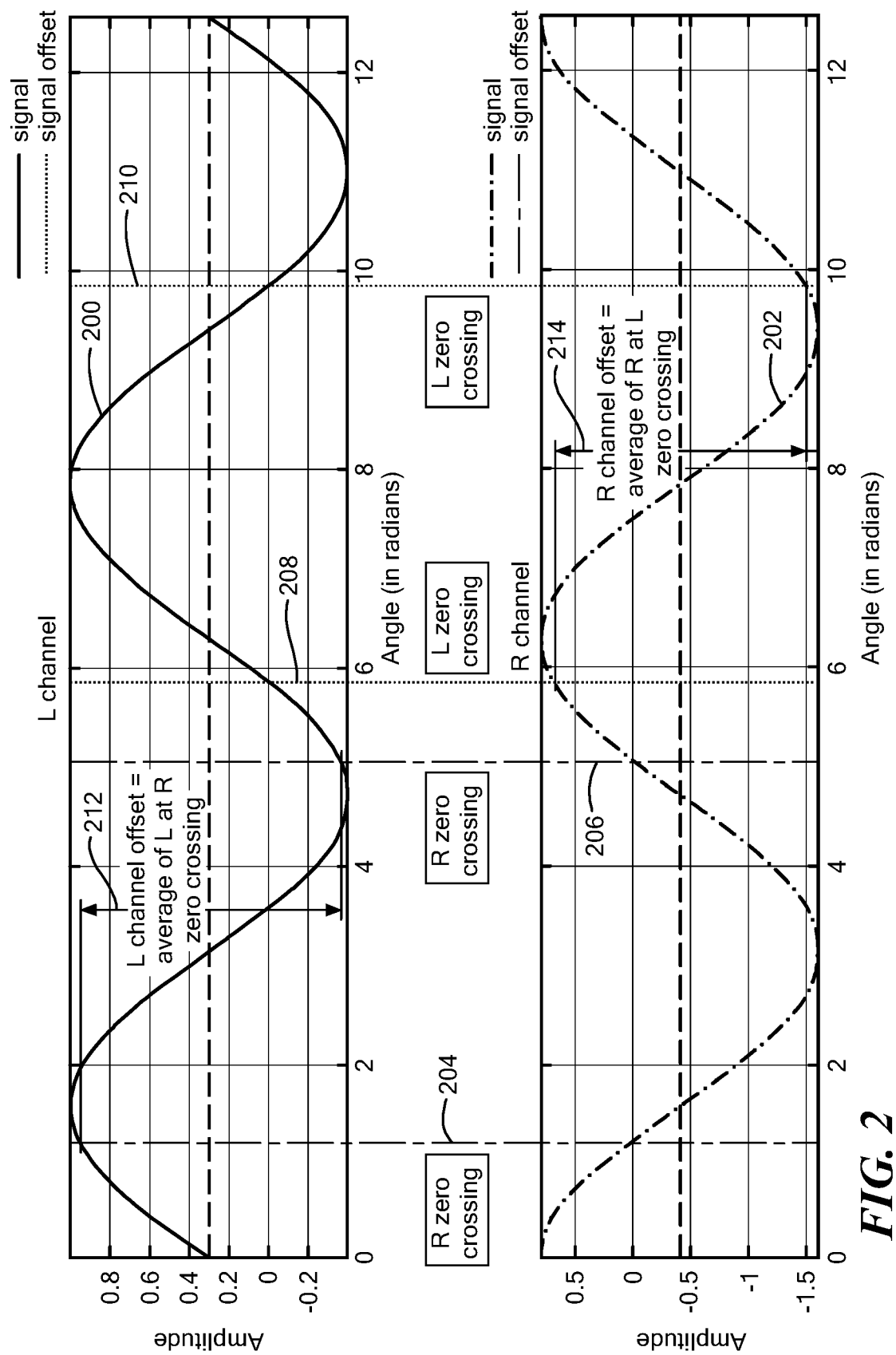
FIG. 2 shows example sine and cosine signals from sensing elements with zero-crossings annotated.

FIG. 2 shows example signals for an L channel 200 and an R channel 202 for signal amplitude over angular position of the target in radians. The L and R signals are orthogonal to each other. A first vertical line 204 is aligned with a first zero crossing, i.e., zero amplitude, of the R channel signal 202 and a second vertical line 206 is aligned with a second zero crossing of the R channel signal. An amplitude of the L channel signal 200 at the first and second zero R channel zero crossings can be stored. Similarly, a third vertical line 208 is aligned with a first zero crossing, i.e., zero amplitude, of the L channel signal 202 and a fourth vertical line 210 is aligned with a second zero crossing of the L channel signal. As described more fully below, an L channel offset 212 corresponds to an average of the L channel amplitudes at the two R channel zero crossings and the R channel offset 214 corresponds to an average of the R channel amplitudes at the two L channel zero crossings.

The respective signals for the L and R channels can be represented as:

$$L = A\sin\theta + B \Rightarrow L = A\sin\theta$$

$$R = C\cos\theta + D \Rightarrow R = A\cos\theta$$

where B and D represent respective offset amplitude, A and C represent respective sensing signal amplitude, and θ represents angular position of a target. It is assumed the absolute value (abs) of (B)<A and abs(D)<C, which means that the L and R signal amplitudes will cross zero.

In example embodiments, as shown and described above, the signal amplitudes of L and/or R are stored when the other signal crosses zero. Consider the zero crossing of the L channel signal 200.

$$L = 0 \Rightarrow \sin\theta = \frac{-B}{A} \Rightarrow \theta = n\pi - (-1)^n \arcsin\left(\frac{B}{A}\right) \text{ where } n \in \mathbb{Z}$$

$$R\left(\theta = n\pi - (-1)^n \arcsin\left(\frac{B}{A}\right)\right) = (-1)^n C\cos\left((-1)^{n+1}\arcsin\left(\frac{B}{A}\right)\right) + D$$

It should be noted that the stored value of R is the same except the polarity of cos term is inverted. The property $\cos(\theta)=\cos(-\theta)$ can be used to average R at two consecutive zero crossings of L, as set forth below:

$$\frac{\left(C\cos\left(\arcsin\left(\frac{B}{A}\right)\right)+D\right) + \left(-C\cos\left(\arcsin\left(\frac{B}{A}\right)\right)+D\right)}{2} = D$$

Thus, we obtain the offset of the L channel signal. The same process can be applied to obtain offset B by storing values of the L channel signal when the R channel signal crosses zero.

Now we can subtract offsets B and D from the L and R channels signals respectively to obtain centered signals.

$$L = A\sin\theta$$

$$R = C\cos\theta$$

If zero crossing detection is performed on one of the corrected signals, the stored value of other signal corresponds to a peak value.

$$L = 0 \Rightarrow \theta = n\pi \Rightarrow R = \pm C$$

$$R = 0 \Rightarrow \theta = n\pi - \frac{\pi}{2} \Rightarrow L = \pm A$$

Then we obtain the amplitude correction factor (ampfactor) as the absolute value of the ratio of the channel amplitudes, e.g., abs(L/R).

$$Rcorrected = ampfactor * C\cos\theta \Rightarrow Rcorrected = A\cos\theta$$

In the above, the amplitude of the R channel signal is corrected in amplitude to match the amplitude of the L channel signal. That is, the L channel signal is not corrected in amplitude. In other embodiments, both signals can be corrected to a desired level.

Figure 3:
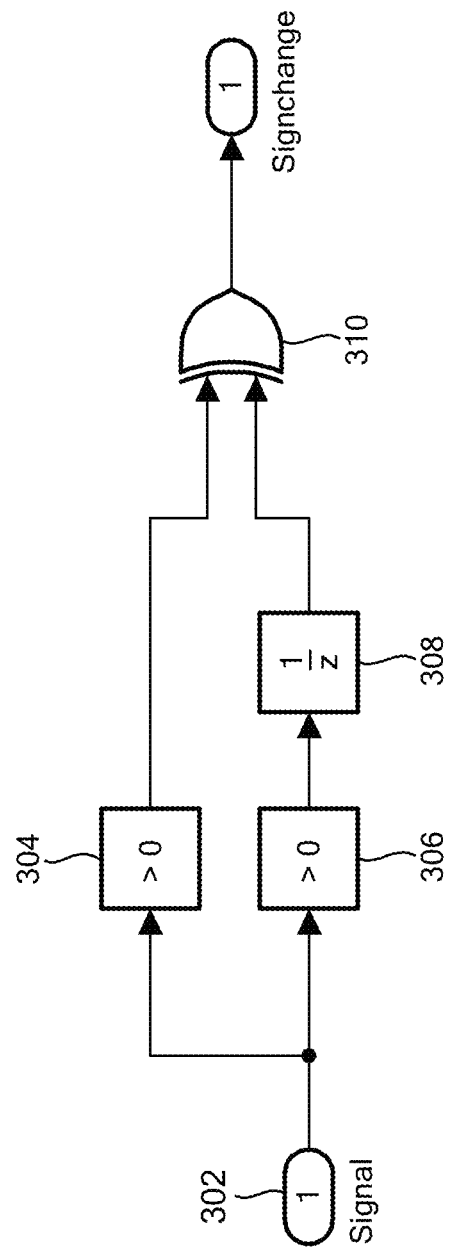
FIG. 3 is a schematic representation of an example zero cross detector.

FIG. 3 shows an example block diagram to detect signal sign changes which correspond to zero crossings. A signal 302 is provide to first and second modules 304, 306 each of which has an output indicative of whether the signal is greater than zero. A signal delay module 308, which may delay the signal one cycle, is coupled to the output of the second module 306. In an example embodiment, an XOR gate 310 receives as inputs the output of the delay module 308 and the output of the first module 304. The output of the XOR gate 310 corresponds to sign changes in the signal 302.

It is understood that a wide variety of mechanisms implemented in hardware, software and combinations thereof, can be used to detect signal changes.

Figure 4:
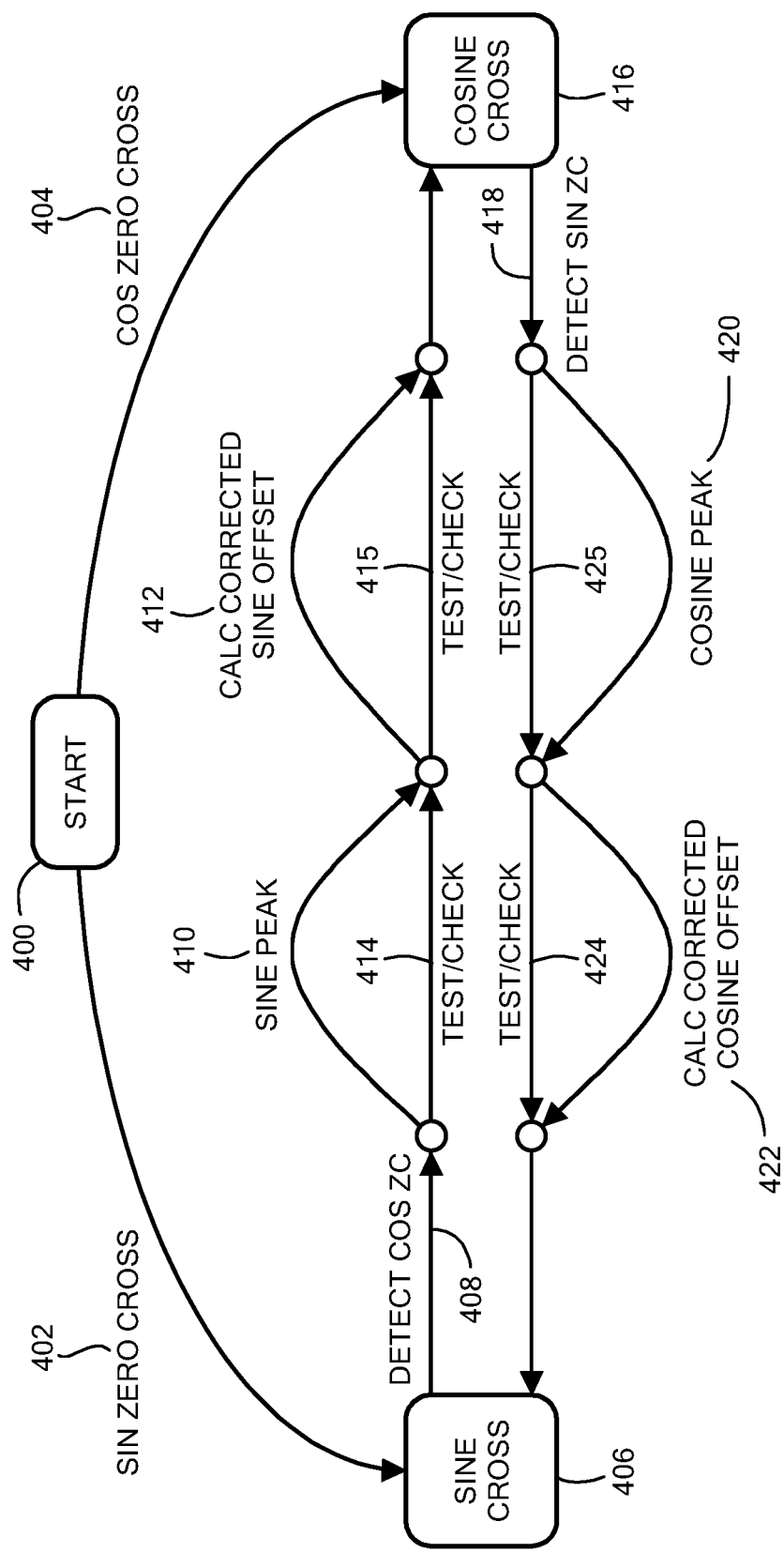
FIG. 4 is a state diagram showing zero crossing detection and offset processing.

FIG. 4 shows an example state machine for storing L and R channel amplitude values at zero crossings and generating offset and amplitude corrections, which can be subtracted from current L and R signals. A feedback loop provides offset correction that over time results in offset free L and R signals. The L and R values stored after this point are the peaks. In an example embodiment, an amplitude correction factor is obtained by using the ratio of the signal peaks, as described above. FIG. 4A shows further detail for the state machine of FIG. 4.

FIG. 4 shows an initial state 400 from which a sine zero crossing 402 or a cosine zero crossing 404 is detected. After a sine cross state 406, a cosine zero crossing 408 is detected to measure a peak of the sine signal 410 after which a corrected sine offset 412 can be determined. Optional testing 414, 415 can be performed, such as detecting errors due to rapid air gap changes. After offset processing 412, and a cosine crossing state 416, a sine zero crossing 418 is detected to measure a peak of the cosine signal 420 which is used to calculate a corrected cosine offset 422. Processing then continues iteratively as the sine cross state 406 is entered. Testing 424, 425 can be performed on the path from cosine cross 414 to sine cross 406, as noted above.

Additional detail for the state diagram of FIG. 4 is provided below in which the following notation is used:
cos=cosine
sin=sine
pk=peak
a leading "p", such as psinoffset, refers to the value from the prior cycle, e.g., a unit delay
a leading "c", such as csinoffset, refers to corrected
zc=zero crossing The below shows example processing for the state diagram of FIG. 4 listed for the corresponding reference numbers:

```
400:    {pcospk=1;psinpk=1;sinpkready=false;cospkready=false;psinoffset=0;pcosoffset=0;
csinoffset=0; ccosoffset=0;}
402:    [sinzc= =1]{pcospk=cos;}
404:    [coszc= =1]{psinpk=sin;}
408:    [coszc= =1]
410:    {sinpkready=true;}
412:    {csinoffset=csinoffset+(sin+psinpk)/2;psinoffset=0;psinpk=(sin−psinpk)/2}
414:    [abs((sin+psinpk)/2)>offseterror]{sinpkready=false;}
415:    [abs(psinoffset−(sin+psinpk)/2)>2*offseterror]{psinoffset=(sin+psinpk)/2;psinpk=sin}
418:    [sinzc= =1]
420:    {cospkready=true;}
422:    {ccosoffset=ccosoffset+(cos+pcospk)/2;pcosoffset=0;pcospk=(cos−pcospk)/2;}
424:    [abs(pcosoffset−(cos+pcospk)/2)>2*offseterror]{pcosoffset=(cos+pcospk)/2;pcospk=cos}
425:    [abs((cos+pcospk)/2)>offseterror]{cospkready=false;}
```

Figure 5A:
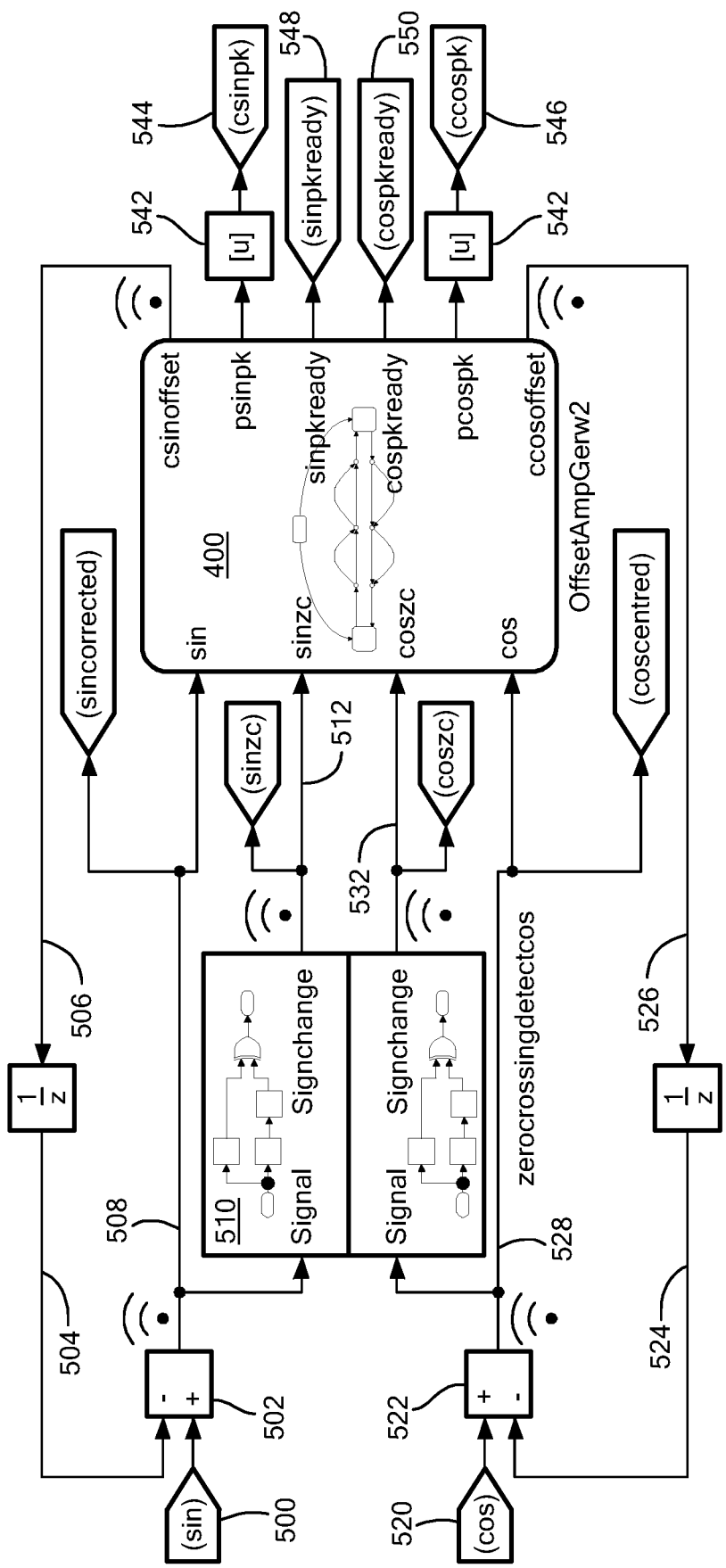
FIGS. 5A and 5B are schematic representations of zero crossing detection and correction signal generation.
Figure 5B:
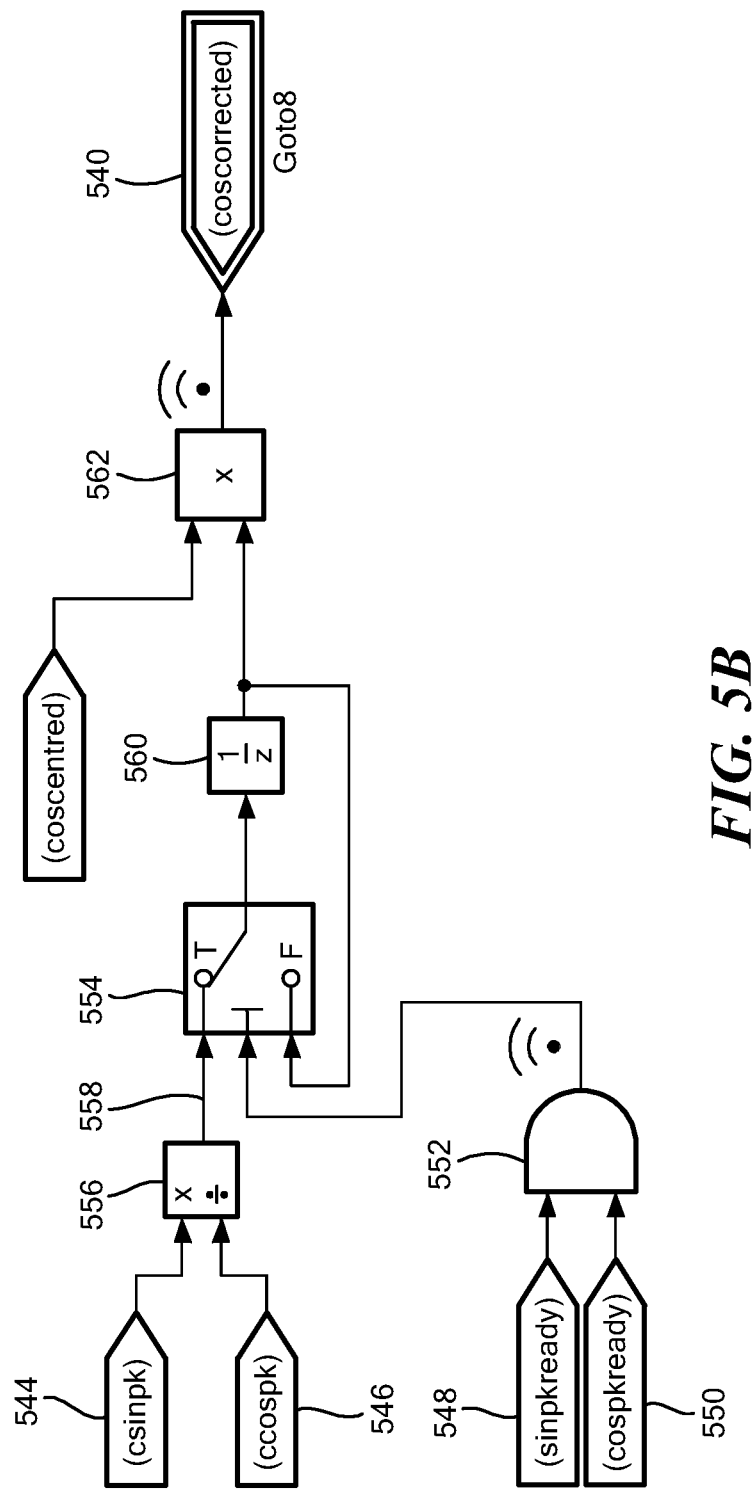

FIGS. 5A and 5B show an example system implementation 500 that includes the state machine 400 of FIG. 4 with the inputs and outputs labeled consistently with FIGS. 5A and 5B. FIG. 5A shows an example implementation for offset correction and FIG. 5B shows an example implementation for amplitude correction.

A sin signal 500 is combined 502, e.g., offset subtracted, with a delayed 504 sinoffset signal 506 calculated by the state machine 400 to generate an offset corrected sin signal 508, which is provided to a sign change detection circuit 510 which outputs a sin zero crossing signal 512 for the state machine. In a similar manner, a cos signal 520 is combined 522, e.g., offset subtracted, with a delayed 524 cosoffset signal 526 calculated by the state machine 400 to generate an offset corrected cos signal 528, which is provided to the sign change detection circuit 510 which outputs a cos zero crossing signal 532. In the illustrated embodiment, the offset corrected cos signal 528 can be referred to a centered signal that is symmetrical about zero amplitude but is not yet corrected for amplitude. Note also, that in this embodiment, only the cosine signal is corrected in amplitude (FIG. 5B) since the cosine signal is corrected to match the amplitude of the offset corrected sine signal (FIG. 6).

To effect amplitude offset correction, the state machine 400 generates a series of signals that can be processed to provide an amplitude corrected cosine signal 540, as shown in FIG. 5B. In the illustrated embodiment, absolute value function 542 outputs a peak sine value 544 and peak cosine value 546. The state machine 400 also generates a sin peak ready signal 548 and a cosine peak ready signal 550, which are inputs to an AND gate 552 with an output coupled to an input of selector logic 554. The peak signals 544, 546 are provided to a multiplier 556 to normalize the signal amplitudes, as described above. An output 558 of the multiplier 556 is coupled to the selector logic 554. An output of the selector logic 554 is coupled to a delay module 560 and the output of the delay module 560 is provided to a multiplier 562 and to an input of the selector logic 554. The offset corrected cosine signal (coscenter) is also an input to the multiplier 562, which outputs the cosine corrected signal 540, which is corrected for offset and amplitude.

Figure 6A:
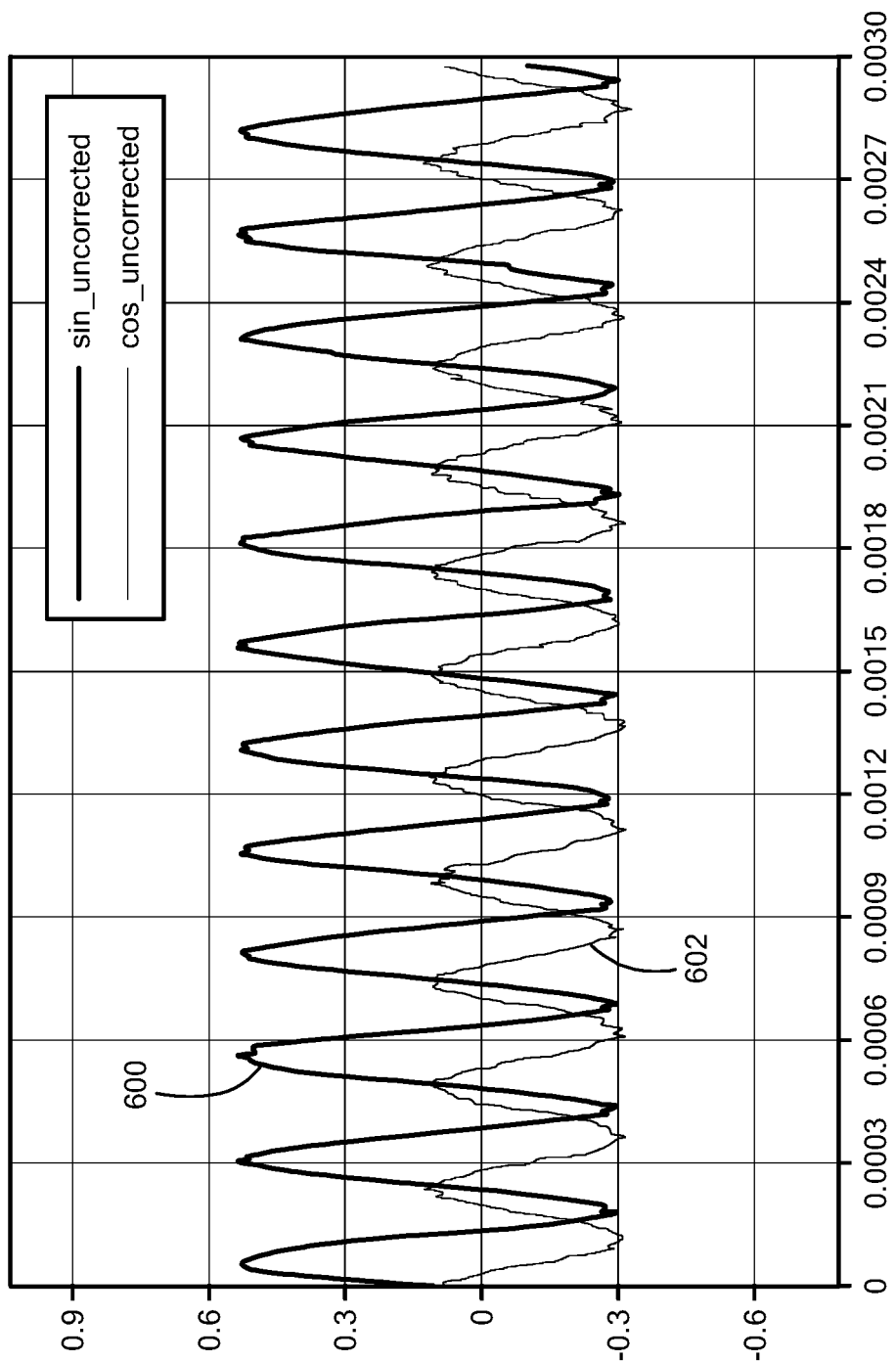
FIG. 6A show uncorrected sine and cosine signals and FIG. 6B shows corrected sine and cosine signals.
Figure 6B:
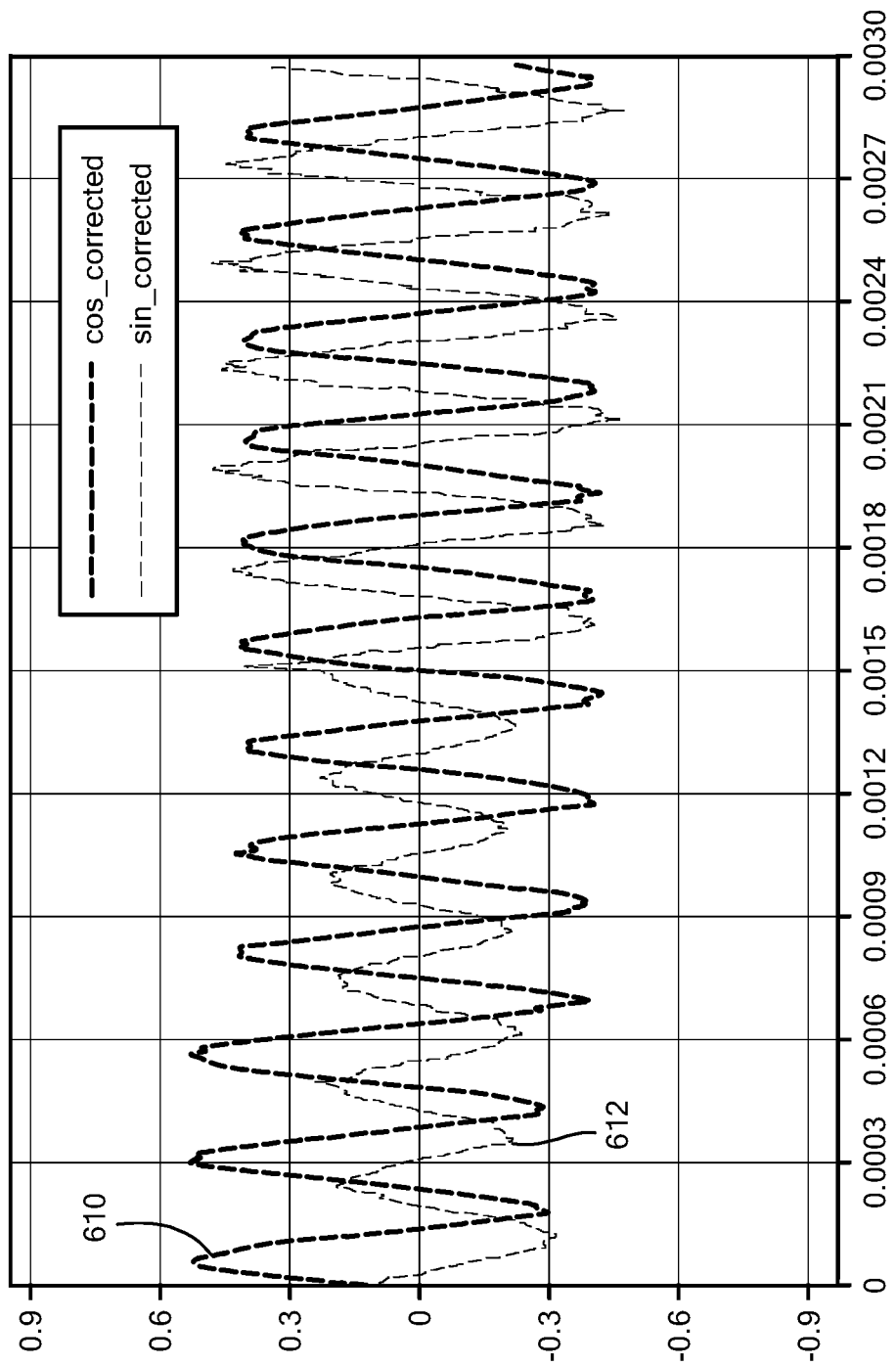

FIG. 6A shows uncorrected sin and cos signals 600, 602. FIG. 6B shows correction over time as sin and cos signals 610, 612 become symmetrical with respect to zero amplitude as the offset is removed and become about equal in amplitude as the signals are normalized. In the illustrated embodiment, the amplitude of the cos signal 612 is adjusted to the match the amplitude of the sin signal 610. In other embodiments, both of the signals are normalized to meet the needs of a particular application.

Figure 7:
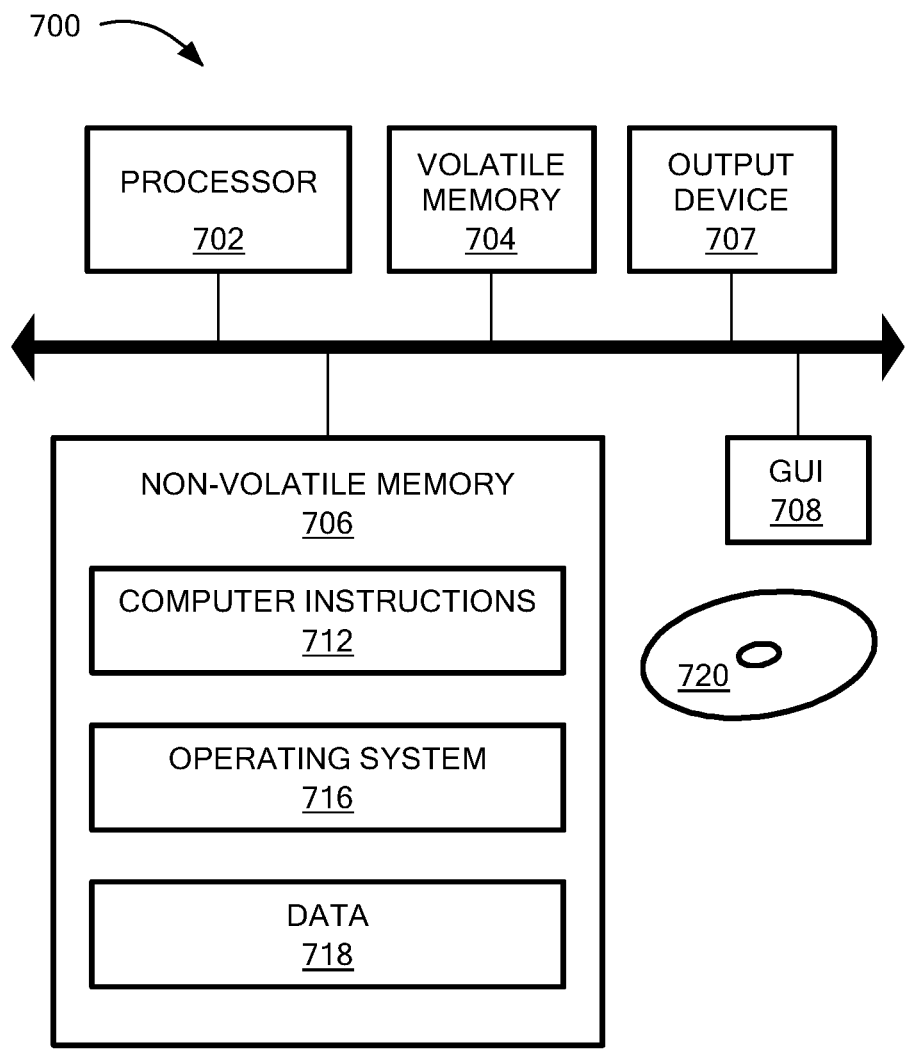
FIG. 7 is a schematic representation of an example computer that can perform at least a portion of the processing described herein.

FIG. 7 shows an exemplary computer 700 that can perform at least part of the processing described herein. For example, the computer 700 can perform processing to perform offset correction and/or amplitude correction, as shown in FIG. 2 to FIG. 5B, as well as signal correction module 108 in FIG. 1. The computer 700 includes a processor 702, a volatile memory 704, a non-volatile memory 706 (e.g., hard disk), an output device 707 and a graphical user interface (GUI) 708 (e.g., a mouse, a keyboard, a display, for example). The non-volatile memory 706 stores computer instructions 712, an operating system 716 and data 718. In one example, the computer instructions 712 are executed by the processor 702 out of volatile memory 704. In one embodiment, an article 720 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Example embodiments may provide advantages over current sensors. For example, example embodiments may require significantly less logic for implementation than conventional offset correction processing. In addition, symmetry of logic between sine and cosine may be exploited by sharing combinational logic between the two signals for reduction in area. Some conventional sensors required a radius checker to handle any sudden airgap changes. In example embodiments, updates occur only at zero crossing events so that checking for airgap change at every step is unnecessary.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" or simply "sensor" is used to describe a circuit that uses one or more magnetic field sensing elements, generally in combination with other circuits. The magnetic field sensor can be, for example, a rotation detector, a movement detector, a current sensor, or a proximity detector.

Magnetic field sensors are used in a variety of applications, including, but not limited to an angle sensor that senses an angle of a direction of a magnetic field, a current sensor that senses a magnetic field generated by a current carried by a current-carrying conductor, a magnetic switch that senses the proximity of a ferromagnetic object, a rotation detector (or movement detector) that senses passing ferromagnetic articles, for example, magnetic domains of a ring magnet or a ferromagnetic target (e.g., gear teeth) where the magnetic field sensor is used in combination with a back-bias or other magnet, and a magnetic field sensor that senses a magnetic field density of a magnetic field.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
receiving a first channel signal from a first magnetic field sensing element;
receiving a second channel signal from a second magnetic field sensing element, wherein the first and second channel signals are in quadrature;
storing a plurality of first amplitude values, each first amplitude value being an amplitude of the first channel signal when an amplitude of the second channel signal crosses a first threshold while the amplitude of the second channel signal is increasing or decreasing;
determining a first offset of the first channel signal based on the plurality of first amplitude values, wherein the first offset of the first channel signal is determined at least in part by calculating an average of the plurality of first amplitude values; and
performing offset correction on the first channel signal by subtracting the first offset from the first channel signal.

2. The method according to claim 1, wherein the first threshold is a zero crossing.

3. The method according to claim 1, wherein the first channel signal comprises a sine signal and the second channel signal comprises a cosine signal.

4. The method according to claim 1, further including storing a plurality of second amplitude values, each second amplitude value being an amplitude of the second channel signal when an amplitude of the first channel signal crosses a second threshold while the first channel signal is increasing or decreasing.

5. The method according to claim 4, further including determining a second offset of the second channel signal based on the plurality of second amplitude values, wherein the second offset of the second channel signal is determined at least in part by averaging the plurality of second amplitude values.

6. The method according to claim 5, further including performing offset correction on the second channel signal by subtracting the second offset from the second channel signal.

7. The method according to claim 1, further including detecting whether an amplitude of the second channel signal crosses the first threshold by detecting a zero crossing of the second channel signal based on a sign change of a delayed version of the second channel signal.

8. A system, comprising:
a first magnetic field sensing element to generate a first channel signal from a first magnetic field sensing element;
a second magnetic field sensing element to generate a second channel signal, wherein the first and second channel signals are in quadrature; and
a signal correction module configured to:
store a plurality of first amplitude values, each first amplitude value being an amplitude of the first channel signal when an amplitude of the second channel signal crosses a first threshold while the amplitude of the second channel signal is increasing or decreasing;
determine a first offset of the first channel signal based on the plurality of first amplitude values, wherein the first offset of the first channel signal is determined at least in part by calculating an average of the plurality of first amplitude values; and
perform offset correction on the first channel signal by subtracting the first offset from the first channel signal.

9. The system according to claim 8, wherein the first threshold is a zero crossing.

10. The system according to claim 8, wherein the first channel signal comprises a sine signal and the second channel signal comprises a cosine signal.

11. The system according to claim 8, wherein the signal correction module is further configured to store a plurality of second amplitude values, each second amplitude value being an amplitude of the second channel signal when an amplitude of the first channel signal crosses a second threshold while the first channel signal is increasing or decreasing.

12. The system according to claim 11, wherein the signal correction module is further configured to determine a second offset of the second channel signal based on the plurality of second amplitude values, the second offset of the second channel signal being determined at least in part by averaging the plurality of second amplitude values.

13. The system according to claim 12, further including performing offset correction of the second channel signal by subtracting the second offset from the second channel signal.

14. The system according to claim 8, wherein the signal correction module is further configured to detect whether an amplitude of the second channel signal crosses the first threshold by detecting a zero crossing of the second channel signal based on a sign change of a delayed version of the second channel signal.

15. The system according to claim 8, wherein the system comprises an IC package.

16. A system, comprising:
a first magnetic field sensing element to generate a first channel signal from a first magnetic field sensing element;
a second magnetic field sensing element to generate a second channel signal, wherein the first and second channel signals are in quadrature; and
a signal correction means for: storing a plurality of first amplitude values, each first amplitude value being an amplitude of the first channel signal at a different zero crossing of the second channel signal, determining an offset of the first channel signal at least in part by calculating an average of the plurality of first amplitude values, and performing offset correction on the first channel signal by subtracting the offset from the first channel signal.

* * * * *